US 8,595,522 B2

(12) United States Patent
Cooper et al.

(10) Patent No.: US 8,595,522 B2
(45) Date of Patent: Nov. 26, 2013

(54) MONITORING TRANSACTION REQUESTS USING A POLICY ENGINE WITHIN A STORAGE DRIVE DRIVER TO CHANGE POWER CAPABILITY AND LATENCY SETTINGS FOR A STORAGE DRIVE

(75) Inventors: Barnes Cooper, Tigard, OR (US); Faraz A. Siddiqi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 157 days.

(21) Appl. No.: 12/894,670

(22) Filed: Sep. 30, 2010

(65) Prior Publication Data

US 2012/0084582 A1    Apr. 5, 2012

(51) Int. Cl.
*G06F 1/26* (2006.01)
*G06F 1/00* (2006.01)

(52) U.S. Cl.
USPC .......................... 713/320; 713/340; 713/300

(58) Field of Classification Search
USPC .................................. 713/320, 330; 369/30
See application file for complete search history.

(56) References Cited

U.S. PATENT DOCUMENTS

| 5,493,670 | A | * | 2/1996 | Douglis et al. ............... 713/324 |
| 5,521,896 | A | * | 5/1996 | Bajorek et al. ............. 369/53.18 |
| 7,573,715 | B2 | * | 8/2009 | Mojaver et al. ............... 361/716 |
| 7,730,235 | B2 | | 6/2010 | Kumasawa et al. |
| 2002/0199129 | A1 | * | 12/2002 | Bohrer et al. ..................... 714/7 |
| 2004/0068672 | A1 | * | 4/2004 | Fisk et al. ..................... 713/323 |
| 2004/0098725 | A1 | * | 5/2004 | Ramesh et al. ............... 719/310 |
| 2005/0171711 | A1 | * | 8/2005 | Tung .............................. 702/63 |
| 2007/0025195 | A1 | * | 2/2007 | Oh et al. .................... 369/30.03 |
| 2007/0073970 | A1 | * | 3/2007 | Yamazaki et al. ............. 711/114 |
| 2007/0294554 | A1 | * | 12/2007 | Kim .............................. 713/323 |
| 2009/0119530 | A1 | * | 5/2009 | Fisk et al. ..................... 713/324 |
| 2010/0005261 | A1 | | 1/2010 | Shiga et al. |

FOREIGN PATENT DOCUMENTS

WO    2012/044609 A2    4/2012

OTHER PUBLICATIONS

International Search Report & Written Opinion received from PCT Application Serial No. PCT/US2011/053419, mailed Apr. 18, 2012, 10 pages.

* cited by examiner

*Primary Examiner* — Thomas Lee
*Assistant Examiner* — Robert Cassity
(74) *Attorney, Agent, or Firm* — Patent Capital Group

(57) ABSTRACT

With embodiments of the invention, a more robust solution is provided using a storage driver that may already be used for the platforms operating system. This is efficient because the storage driver typically already monitors storage drive access requests, and thus knows when traffic is outstanding (performance may be critical) or when it's not outstanding (and power may be saved).

24 Claims, 4 Drawing Sheets

MONITORING TRANSACTION REQUESTS USING A POLICY ENGINE WITHIN A STORAGE DRIVE DRIVER TO CHANGE POWER CAPABILITY AND LATENCY SETTINGS FOR A STORAGE DRIVE

TECHNICAL FIELD

The present invention relates generally to computing systems and in particular, to managing storage drive power and/or performance in a computing system.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

With computing platforms such as portable personal computers (PCs), power management schemes such as the Advanced Configuration and Power Interface (ACPI) provide for different system, platform, and processing core power and performance states that allow for different parts of a computing platform to be at higher or lower power consumption and performance states for more efficient operation over time, respectively. The performance/power state for a platform component is typically controlled by the platform operating system, based on various parameters, e.g., task demands, available power, etc.

Unfortunately, presently implemented performance state management can be based on considerations that are not granular enough to account for demand activity for individual devices such as storage drives including hard disk drives (HDDs), solid state drives (SSDs), and optical disk drives (ODDs). For example, there may be performance problems associated with negative interactions between power management states, e.g., where induced latency noticeably impairs performance due to storage drive bottlenecks. For example, low-latency SSDs may be highly sensitive to this problem. Currently, in order to redress such problems, users may simply shut off power management options on their computers, or simply tolerate the performance hits.

Storage VRs (voltage regulators used to supply power to storage devices) typically have some of the biggest losses across platform power supplies. In response, companies are producing products that incorporate hardware based power profiling and heuristics on the drive in order to better manage their performance/power states. Unfortunately, such approaches can require excessive additional overhead and may not even function to a desired level.

Accordingly, the present disclosure presents new approaches for redressing these issues. With some embodiments of the invention, a more robust solution is provided using a storage driver that may already be used for the platforms operating system. This is efficient because the storage driver typically already monitors storage drive access requests, and thus knows when traffic is outstanding (performance may be critical) or when it's not outstanding (and power may be saved). So, the approach is moved closer to the storage driver with implicit knowledge of when critical power saving or performance opportunities are available. For example, when no transactions outstanding to a drive, the drive may be power managed to save power and allow the system to enter into a deep low-power state (assuming some other device is not inhibiting it). On the other hand, when transactions are outstanding to the drives, the voltage regulators are activated, the drives are readied, and then the platform latency is ratcheted down such that power management is out of the way and sufficient performance may be delivered on demand.

Figure 1:
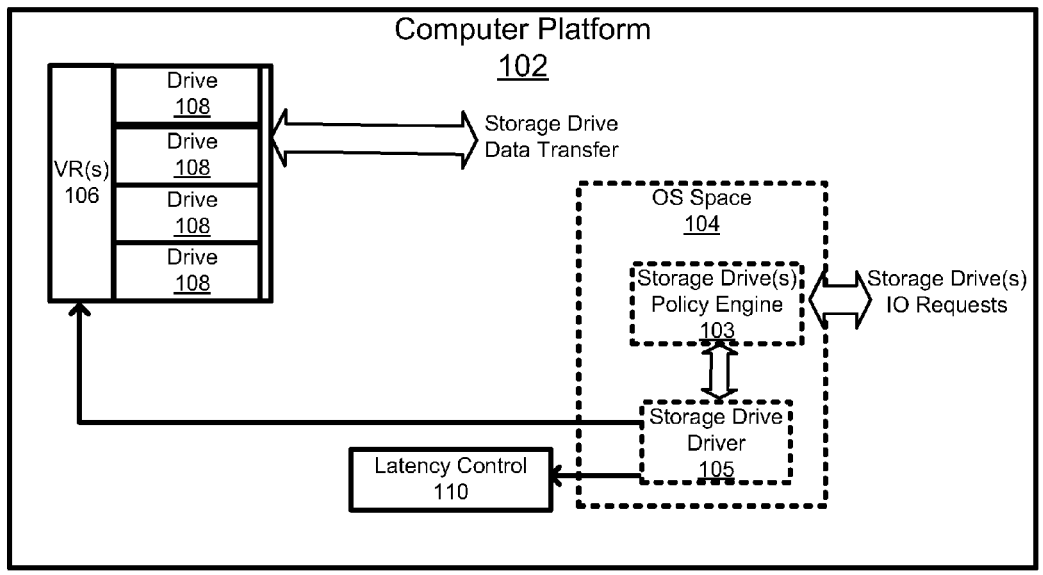
FIG. 1 is a diagram of a computer platform with a storage drive policy engine in accordance with some embodiments.

FIG. 1 is a diagram of a computing platform 102 with a storage drive policy engine for managing storage drive performance and power consumption. Shown is a generalized portion of a computing platform such as a portable computer (netbook, notebook, tablet, smart phone, etc.), a desktop computer, a server computer, or any other suitable computing device. The depicted platform comprises executing operating system OS software 104, one or more storage drives 108, a voltage regulator 106 to provide power to the storage drives 108, and a latency control register 110, coupled as shown. The OS space executes in one or more processor cores (not shown) and includes a storage drive policy engine (SDPE) 103 and one or more storage drive drivers 105. (Typically, each storage drive 108 will have an associated storage driver 105. Likewise, there may be more than one storage drive policy engine 103. For example, there may be one for each drive, or alternatively one or several SDPE instantiations may be employed to manage performance for the various drives 108.)

The storage drives 108 may comprise any suitable drive technology including but not limited to hard disk drives, optical disk drives, solid-state drives and any other future drive technology that may not yet be appreciated.

Figure 2:
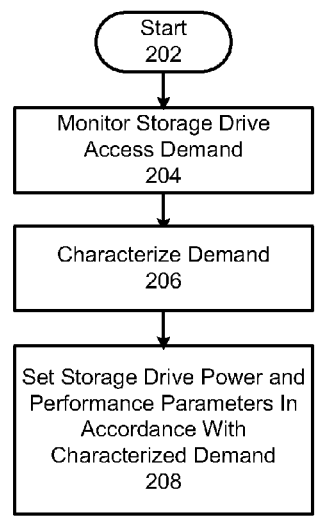
FIG. 2 shows a routine for managing storage drive performance and power in accordance with some embodiments.

FIG. 2 shows a routine for implementing a storage drive policy engine in accordance with some embodiments. At 204, storage drive access demand is monitored. This may be done using the storage driver 105, which as noted above, will typically be aware of any access (to read or write data) request. At 206, the policy engine characterizes the storage drive access demand. That is, it determines if it is high enough to warrant placing the drive in a low (or lower) latency mode and providing it with appropriate power via the VR 106, or conversely, if it is low enough to warrant increasing the latency setting and reducing VR output. At 208, it sets an appropriate performance setting and power state for the drive based on the characterized demand.

In some embodiments, a latency control register 110 may be used to set the performance setting, e.g., through a latency setting. The register, which may include one or more registers, may be used to control platform latency for the presently exposed OS power state, e.g., C1, C2, C3 states in a platform using ACPI. Latency control settings may affect one or several different components contributing to transaction speed capability for the drive. For example, they may affect priority settings, power settings, link definitions, etc. By adjusting the latency for each storage drive, the overall depth of platform power management may be bounded in use dynamically, thereby optimizing for energy efficiency when transactions are not outstanding (large latency values), and optimizing for performance when they are outstanding (short latency values).

The storage driver 105 is generally utilized any time transaction requests (transfers involving the storage drive) are issued to a particular drive. The storage driver 105 can also hold these requests in a queued state to hold off transactions getting to the particular hardware. (This may be done through software constructs.) The policy engine 103 may be disposed in software such that when no transactions are outstanding to a particular storage drive 108 for a relatively short time interval, latency restrictions on the platform can be removed, thereby allowing for deeper power managed states to become dynamically available. The storage drives 108 may also aggressively be sent to sleep or standby states, and, for example, light-load signaling to the VRs 106 that feed the drives may be asserted. (With this situation, the drives would be quiescent, as no commands or sufficiently low-priority commands have been issued for some period of time.)

Figure 3:
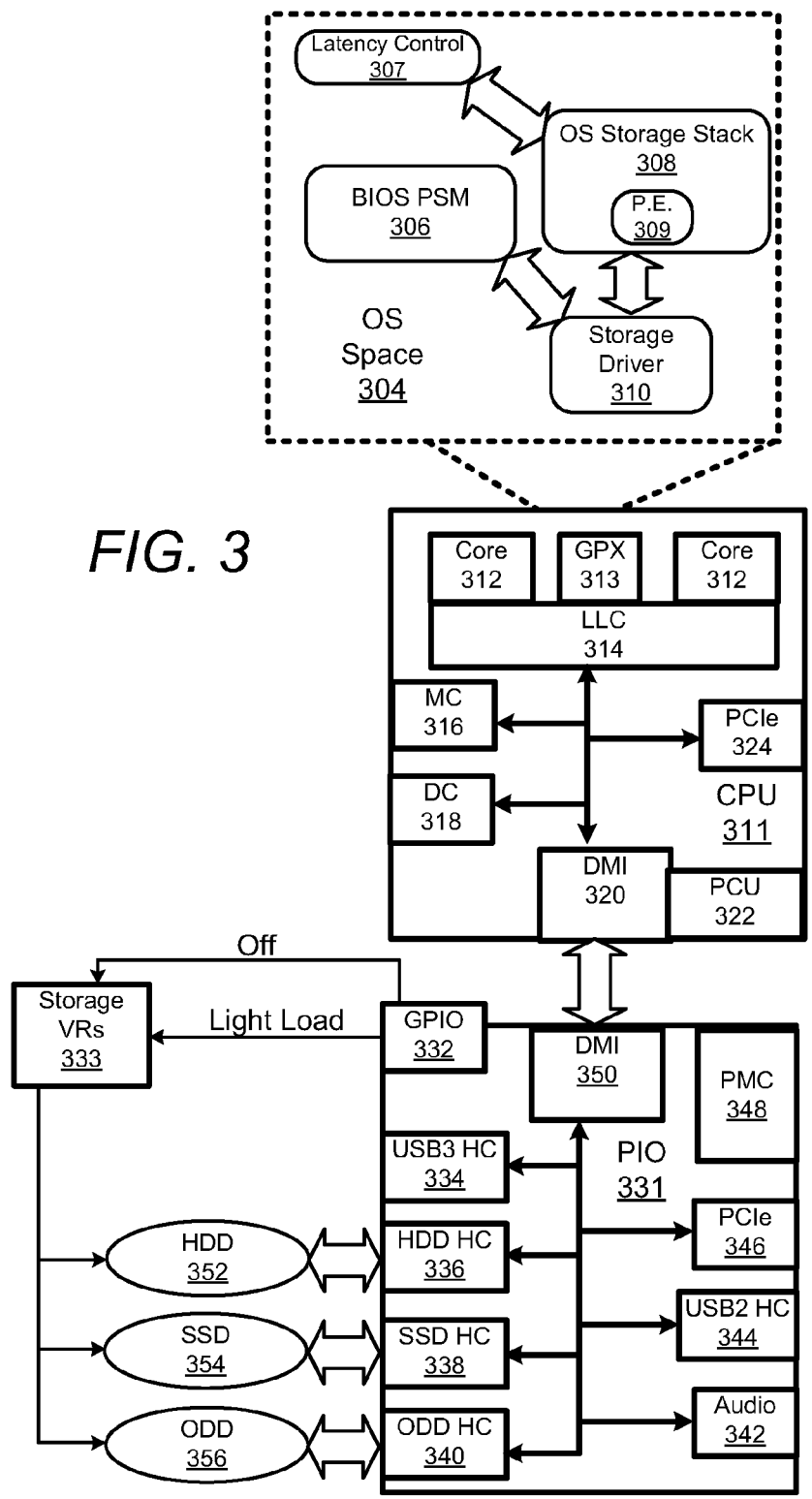
FIG. 3 is a diagram showing a computer platform with storage drive performance/power management in accordance with a more particular embodiment.

FIG. 3 shows a computing platform with a storage drive policy engine in a more detailed example. The depicted platform comprises a CPU chip 311 coupled to a platform IO chip 331 via a direct media interconnect (DMI) interface 320/350. The platform also includes a hard disk drive 352, a solid state drive 354, and an optical disk drive 356 coupled through the platform to the PIO chip 350 to provide to it non-volatile memory. The drives are powered via one or more storage VRs 333, which are controlled through a general purpose input/output (GPIO) interface 332. (For convenience, other platform components that would be connected to the PIO chip or CPU chip, e.g., displays, peripheral devices, etc., are not depicted.)

The PIO chip 331 includes drive interface controllers (336, 338, 340) for controlling data transfers between the drives and the other parts of the platform. For example, one or more of the host controllers could comprise AHCI and/or SATA compliant controllers. (The Advanced Host Controller Interface (AHCI) is a programming-specification which defines the operation of Serial ATA host-controllers (also known as host bus adapters) in a non implementation-specific manner. The specification describes a system memory structure for computer hardware vendors in order to exchange data between host system memory and the attached storage-devices. AHCI offers software developers and hardware designers a standard method for detecting, configuring, and programming SATA/AHCI adapters. AHCI is separate from the Serial ATA-II standard, although it exposes SATA's advanced capabilities (such as hot-plugging and native command queuing) such that host-systems can utilize them. Many SATA controllers offer selectable modes of operation: legacy Parallel ATA, standard AHCI-mode, or vendor-specific RAID.

The CPU chip 311 comprises one or more processor cores 312, a graphics processor 313, low level cache (LLC) 314, memory controller 316, a display interface controller 318, and a PCI Express interface controller 324. One or more of the cores 312 execute operating system software (OS space) 304, which comprises BIOS power state management code 306, one or more storage drivers 310, and an OS storage stack 308 including a storage drive policy engine 309 for controlling power/performance states for one or more of the storage drives 352, 354, and/or 356. (Note that the policy engine is shown as part of the OS storage stack 308, but it is not so limited. For example, it could be part of the driver itself, or it could be run in a separate part of the platform. it could be provided by the OS vender, storage drive vender, or by some other entity.) Also included here is a latency register 307, which may be implemented using software or may correspond to hardware accessible to the OS space.

The SDPE 309 may arise from modifications to an OS storage driver, or optionally, it could be designed from a filter driver residing above the storage driver (as is depicted). In the illustrated embodiment, it uses GPIOs on the PIO chip to control the storage VRs 333 to signal light and no load conditions and to communicate with storage VR subsystems. It also uses system BIOS ACPI methods to control the VRs. (In the depicted embodiment, the BIOS is used for controlling the storage drives since it typically includes platform specific information to do so, thereby allowing the OS (e.g., storage driver) based approach to be platform independent. However, any suitable alternative, e.g., EFI (extensible firmware interface could alternatively be used.

Figure 4:
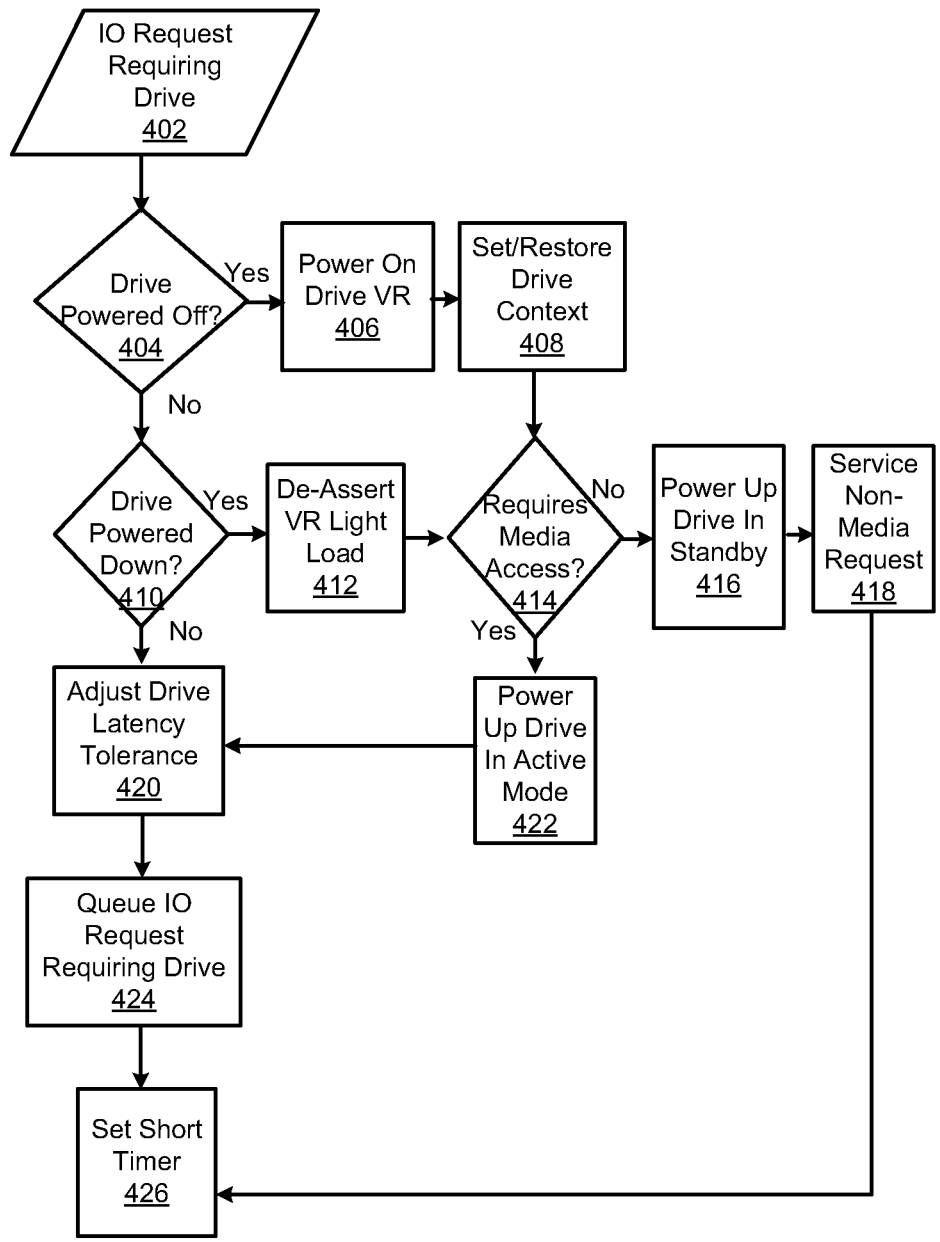
FIG. 4 is a flow diagram showing a routine for managing storage drive access requests in accordance with some embodiments.

FIG. 4 shows a routine for coming out of a reduced storage drive power state. (Note that the routines of FIG. 4 and FIG. 5, discussed below, may be used cooperatively to manage power/performance for a given storage drive.) At 402, a storage drive IO transaction request is detected. At 404, it determines if the drive is powered off. If it is off, then at 406, it powers on the drive VR. At 408, it sets and/or restores the storage drive context, e.g., default or preset settings for an active mode. At 414, it checks to see if the access is a media access request, e.g., a request for a movie, stored on the drive, to be played to a user, implying the need for a low latency setting and higher power capability. If the access request is for media access, then the drive is powered up in an active mode at 422, and at 420, the drive latency setting is set for a sufficiently low latency. At 424, the task request is queued for servicing, and at 426, a short timer is then set.

Returning back to 414, if the access request is not for media access, then at 416, the drive is powered up in a standby mode, and at 418, the non media request is serviced. Finally, at 426, the short timer is set.

Thus, with this routine, when a transaction request is submitted to a drive, the policy engine can "hold" the commands pending, in a software queue (e.g., using the storage driver) and analyze the pending commands and determine whether they should be serviced. That is, it is determined whether any specific power down actions should be completely or partially undone, or if they should remain as they are. A pending command that does not require access to drive's storage or physical media can be completed by partially powering-up the drive into "Power-on Standby" state rather than full power-up (e.g., Active) state. This helps minimize disruption to the power saving features due to software that may periodically ping for the drive's presence.

At the same time, if the incoming transactions are targeted for media data on the drive and therefore, require full (e.g., active mode) power-up, then power-down actions that may have been done can be undone to complete the incoming request. Once the drive is fully powered-up, it can then determine whether the latency tolerance should be adjusted for the platform, even though it may still be in a platform power management state (e.g., even a deep sleep, standby, etc. state) based on the type of I/O requests that are pending in the software queue. For example, a pending stream of bulk transfer requests may indicate that upon drive power-up, tighter latency tolerance may be desired to allow maximum throughput from the drives. Therefore, under high I/O (i.e., I/O drive access transaction) demand scenarios, the policy engine can either write to the latency control register (which controls latency tolerance for the drive) or dynamically demote C-state logic by communicating with the OSPM C-state algorithm using ACPI notification in the platform to set tighter latency tolerance, thus avoiding deep power management state latency. Therefore, with some embodiments disclosed herein, the best of both worlds (power savings and increased performance) may be attained, at least to a reasonable level.

Figure 5:
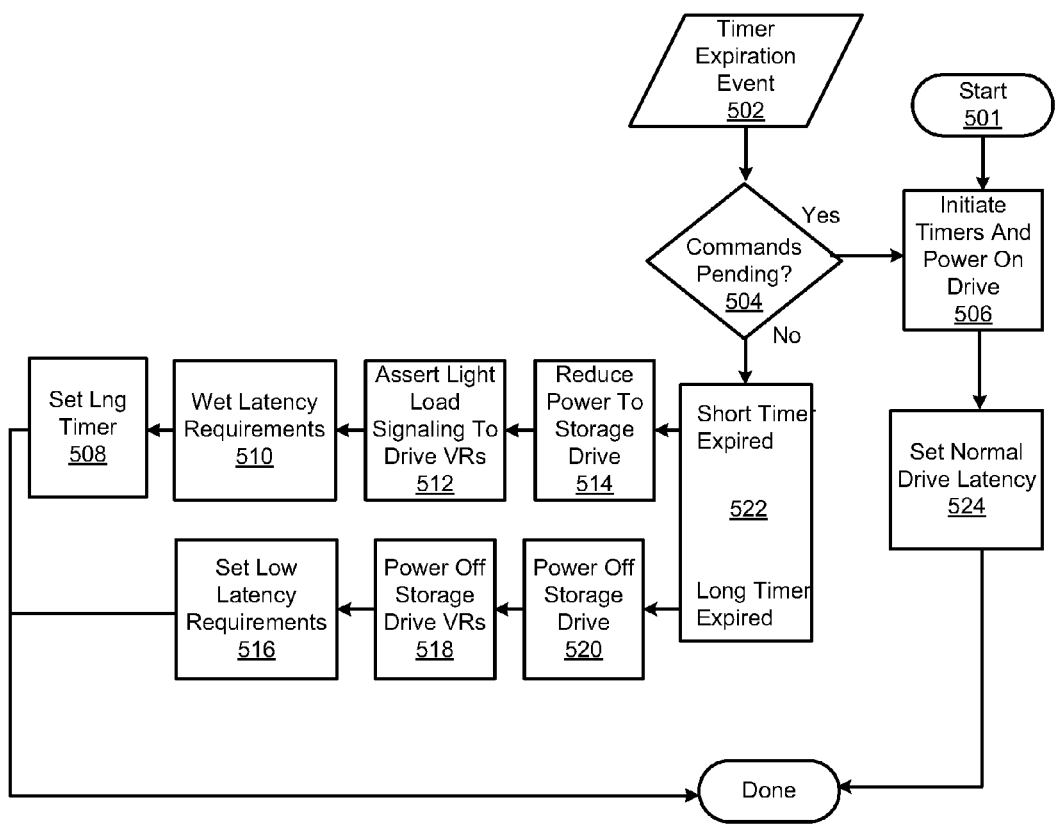
FIG. 5 is a flow diagram showing a routine for managing the reduction of power to a storage drive in accordance with some embodiments.

FIG. 5 shows a routine for entering into a reduced storage drive power mode in accordance with some embodiments. It may be entered, at least initially (e.g., power-up) at 501, or it may be entered from the expiration of a short or long timer at 502 (the same short timer from the routine of FIG. 4). The timers are used to identify gaps of time (short and longer gaps) when a transaction access request for a storage driver is not pending. It should be appreciated that the terms "short" and "long" are terms that are relative to each other, conveniently facilitating first and second timers. There actual durations will depend on platform parameters and desired performance. More or less timers could also be used, depending on desired granularity.

Assuming that the routine is entered off of a timer expiration, then, at 504, the policy engine determines if any commands are pending. For example, commands from a previously pending access request may still need to be serviced. If there are remaining commands to be performed, then at 506, it resets and initiates the timers and powers on the drive. From here, it goes to 524 and sets a normal (default) drive latency and ends.

On the other hand, if at 504, there were no commands pending, then if the expired timer was the short timer, then it goes to 514 and reduces power to the storage drive. At 512, it asserts light-load signaling to the storage drive VRs. At 510, it sets (increases) the latency tolerance, and at 508, it sets the long timer and exits the routine.

Returning back to 522, if the long timer expired, then it powers off the storage drive at 520, powers off the storage drive VRs at 518, sets low latency requirements (even longer latency tolerance) at 516, and exits the routine.

Thus, with the routine of FIG. 5, after a longer period (long timer) of no transactions submitted to the storage driver, the drive may be even further powered off (but at the same time, saving any necessary context ahead of time). A GPIO (e.g., through ACPI BIOS method) may be used to power off the drives completely. Once the drive has been completely powered down, additional power savings can be achieved by putting the storage controller in a lower power state, as well, (e.g., in an ACPI context, it could be placed in D3 or deeper, an S0ix state for example).

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a diagram. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS., for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A memory storage device having instructions, that when executed in a computing platform, cause it to perform a method, comprising:

monitoring, by a policy engine within a storage drive driver, storage drive access demand to determine if transaction access requests are not being submitted for the driver for a sufficient amount of time;

if transaction access requests are not being submitted for the sufficient amount of time, then changing priority settings for a drive and reducing power supplied to the drive using at least one register to be used to increase platform latency for an exposed operating system power state;

detecting a storage drive transaction request;

determining that the storage drive transaction request is a media access request for media stored on the drive;

increasing a power capability for the drive; and decreasing a latency setting for the drive.

2. The storage device of claim 1, further comprising increasing latency tolerance for the drive if transaction access requests are not being submitted for the sufficient amount of time.

3. The storage device of claim 2, wherein the reducing power and increasing latency tolerance is initiated by the policy engine running in operating system space for the platform.

4. The device of claim 2, wherein increasing latency tolerance for the drive comprises setting a latency control register state.

5. The device of claim 1, wherein the storage drive is controlled through a platform BIOS utility.

6. The device of claim 1, wherein monitoring comprises monitoring for a first amount of time and reducing the drive power to a first power state if transaction access requests are not being submitted for the first amount of time.

7. The device of claim 6, wherein monitoring comprises monitoring for additional time if transaction requests are not being submitted for the first amount of time and then reducing the drive power state to a second power state if access requests are not submitted for the additional time, the second power state resulting in less power consumption than the first power state.

8. The device of claim 7, wherein the second power state encompasses reducing power to a controller to the drive.

9. The device of claim 6, comprising increasing drive latency to a first level if transaction access requests are not being submitted for the first amount of time.

10. The device of claim 9, comprising increasing drive latency to a second level if access requests are not submitted for the additional time, the second level being longer than the first level.

11. A computing apparatus, comprising:
a storage drive and a storage drive driver to facilitate access to the storage drive;
a voltage regulator to supply power to the storage drive;
a policy engine, within the storage drive driver, to monitor the storage drive driver to determine if transaction access requests are not being submitted for the driver for a sufficient amount of time, wherein if transaction access requests are not being submitted for the sufficient amount of time, then the apparatus is configured to:
change priority settings for the storage drive;
reduce power being supplied to the storage drive, wherein at least one register is used to increase platform latency for an exposed operating system power state;
detect a storage drive transaction request;
determine that the storage drive transaction request is a media access request for media stored on the drive;
increase a power capability for the drive; and
decrease a latency setting for the drive.

12. The computing apparatus of claim 11, wherein the policy engine is to increase latency tolerance for the storage drive if transaction access requests are not being submitted for the sufficient amount of time.

13. The computing apparatus of claim 12, wherein the policy engine increases latency tolerance for the drive by setting a latency control register state.

14. The computing apparatus of claim 12, wherein the policy engine increases latency tolerance for the drive by changing an operation system based power management state.

15. The computing apparatus of claim 14, wherein the policy engine increases latency tolerance for the drive by changing an Advanced Configuration Power Interface (ACPI) state through a BIOS ACPI feature.

16. The computing apparatus of claim 11, comprising a platform BIOS utility for controlling the storage drive.

17. The computing apparatus of claim 11, wherein the policy engine reduces storage drive power to a first power state if transaction access requests are not being submitted for a first amount of time.

18. The computing apparatus of claim 17, wherein the policy engine, if transaction requests are not being submitted for the first amount of time, is to reduce the drive power state to a second power state if access requests are not submitted for additional time beyond the first amount of time, the second power state resulting in less power consumption than the first power state.

19. The computing apparatus of claim 18, wherein the second power state encompasses reducing power to a controller for the drive.

20. The computing apparatus of claim 17, wherein the policy engine is to increase drive latency to a first level if transaction access requests are not being submitted for the first amount of time.

21. The computing apparatus of claim 20, wherein the policy engine is to increase the drive latency to a second level if access requests are not submitted for the additional time, the second level being longer than the first level.

22. An apparatus, computing:
a storage drive;
a voltage regulator to supply power to the storage drive;
a processor coupled to the storage drive, the processor to execute a storage driver for the storage drive; and
a policy engine, within the storage drive driver, to control power and latency states for the storage drive independent of a separate power management system implemented for the processor, wherein the policy engine is configured to monitor the storage drive driver to determine if transaction access requests are not being submitted for the driver for a sufficient amount of time, wherein if transaction access requests are not being submitted for the sufficient amount of time, then the apparatus is configured to:
change priority settings for the storage drive;
reduce power being supplied to the storage drive, wherein at least one register is used to increase platform latency for an exposed operating system power state;
detect a storage drive transaction request;
determine that the storage drive transaction request is a media access request for media stored on the drive;
increase a power capability for the drive; and
decrease a latency setting for the drive.

23. The apparatus of claim 22, wherein the processor executes an operating system that implements the separate power management system.

24. The apparatus of claim 23, wherein the separate power management system is the Advanced Configuration and Power Interface system.

* * * * *